(12) United States Patent
Manansala

(10) Patent No.: US 7,146,029 B2
(45) Date of Patent: Dec. 5, 2006

(54) CHIP CARRIER FOR FINGERPRINT SENSOR

(75) Inventor: Michael C. Manansala, Santa Clara, CA (US)

(73) Assignee: Fujitsu Limited, Kawasaki (JP)

( * ) Notice: Subject to any disclaimer, the term of this patent is extended or adjusted under 35 U.S.C. 154(b) by 201 days.

(21) Appl. No.: 10/377,997

(22) Filed: Feb. 28, 2003

(65) Prior Publication Data

US 2004/0170307 A1    Sep. 2, 2004

(51) Int. Cl.
G06K 9/00    (2006.01)

(52) U.S. Cl. .................. 382/126; 382/115; 382/124; 382/125

(58) Field of Classification Search ........ 382/115–127; 340/5.53, 5.83; 396/15
See application file for complete search history.

(56) References Cited

U.S. PATENT DOCUMENTS

| | | | | |
|---|---|---|---|---|
| 4,227,805 A * | 10/1980 | Schiller | ........................ | 356/71 |
| 4,246,568 A * | 1/1981 | Peterson | ....................... | 382/126 |
| 4,649,418 A | 3/1987 | Uden | ........................... | 257/679 |
| 4,905,293 A * | 2/1990 | Asai et al. | .................... | 382/126 |
| 5,412,463 A * | 5/1995 | Sibbald et al. | ................. | 356/71 |
| 5,963,679 A | 10/1999 | Setlak | .......................... | 382/312 |
| 6,014,066 A | 1/2000 | Harberts et al. | ............. | 333/104 |
| 6,028,773 A | 2/2000 | Hundt | ......................... | 361/760 |
| 6,307,258 B1 | 10/2001 | Crane, Jr. et al. | ............ | 257/680 |
| 6,643,389 B1 * | 11/2003 | Raynal et al. | ............... | 382/124 |
| 6,785,407 B1 * | 8/2004 | Tschudi et al. | .............. | 382/124 |
| 6,970,584 B1 * | 11/2005 | O'Gorman et al. | .......... | 382/126 |
| 2002/0081780 A1 | 6/2002 | Salatino et al. | .............. | 438/127 |
| 2002/0106115 A1 * | 8/2002 | Rajbenbach et al. | ......... | 382/126 |
| 2002/0196963 A1 * | 12/2002 | Bardwell | ...................... | 382/124 |
| 2003/0002717 A1 * | 1/2003 | Hamid | ......................... | 382/124 |
| 2003/0170933 A1 | 9/2003 | Manansala | ................... | 438/116 |
| 2003/0224553 A1 | 12/2003 | Manansala | ................... | 438/116 |
| 2005/0039052 A1 * | 2/2005 | O'Donnell et al. | .......... | 713/201 |

* cited by examiner

*Primary Examiner*—Jingge Wu
*Assistant Examiner*—Shefali Patel
(74) *Attorney, Agent, or Firm*—Sheppard Mullin Richter & Hampton LLP

(57) ABSTRACT

A carrier for a sweep-type fingerprint sensor and a method of operation are disclosed. The carrier has a recess for receiving and mounting the fingerprint sensor and one or more tactile elements for assisting the user in positioning a finger, and in correctly moving the finger across the sensor being read. In one embodiment the tactile element consists of an oval ridge, or a portion thereof, defining a major axis which is lies in the sweep direction. The tip of the finger is initially positioned in the arcuate portion of the oval ridge and is moved across the sensor, generally along the axis of the oval. The side walls of the ridge assist the user in correctly moving the finger across the sensor.

19 Claims, 4 Drawing Sheets

CHIP CARRIER FOR FINGERPRINT SENSOR

CROSS REFERENCE TO RELATED APPLICATIONS

This application is related to commonly owned U.S. patent application Ser. No. 10/160,438, entitled "System for Flexible Interconnect Packaging" and U.S. patent application Ser. No. 10/094,954, entitled "System for Providing an Open-Cavity Low Profile Encapsulated Semiconductor Package," the disclosures of which are incorporated by reference.

FIELD OF THE INVENTION

The present invention relates to biometric sensors, and is particularly related to packaging for sweep-type fingerprint sensors, and methods for using such sensors.

BACKGROUND OF THE INVENTION

Devices and methods for biometric identification are becoming increasingly important for providing secure access to restricted areas or devices. Biometric sensing offers significant advantages over alternative methods of restricting access to sensitive areas and equipment to authorized users. Fingerprint sensing has become one of the most important biometric sensing techniques. However, widespread adoption of fingerprint sensing technology depends on the availability of low cost, reliable and consistent devices. The availability of low cost, small fingerprint sensor now makes them suitable for use in compact consumer devices, such as cell phones, lap top computers and personal digital assistants (PDAs) where security is a concern.

Two types of common electronic fingerprint devices using silicon based CMOS technology have been introduced into the market, and have largely replaced prior optical sensing devices. The first is the single-touch sensor, which requires that the user simply position his or her finger on sensor to be read. The second is the sweep-type sensor, which requires that the user move or "swipe" his or her finger across the sensor, which then reconstructs the fingerprint by capturing a series of frames comprising "images" of discrete portions of the finger being swiped. For purposes of understanding the present invention, it is not necessary to describe the details of how electronic fingerprint sensors operate. In summary, the ridges and valleys of a fingerprint are detected by an array of electrodes formed in the sensor chip. Such operation is well-known in the art, and does not constitute part of the present invention. The sweep-type fingerprint sensor offers significant advantages, insofar as it uses an array consisting of substantially fewer electrodes. This translates into smaller, more compact size and reduced manufacturing costs.

The process of fingerprint identification involves the initial step whereby the user's finger is "enrolled," i.e., an initial image of the fingerprint is captured by the sensor (in combination with the related processing system) and stored for later comparison. Thereafter, the user will use the sensor for purposes of authentication. Both enrollment and authentication require precise and accurate capture of the fingerprint image. If the image taken from the user during enrollment has limited or unrecognizable data points, either the enrollment will be rejected or, if accepted, there will be the increased likelihood that authentication will be more difficult due to an increased rejection rate. Both of these will cause delay in obtaining authentication or inability to obtain authentication. The problems with accurate enrollment and authentication are more acute with sweep-type fingerprint sensors.

SUMMARY OF THE INVENTION

In order to overcome these problems, the present invention is generally directed to structures and methods which assist users in accurately and consistently positioning their fingers on sweep-type fingerprint sensors prior to being read (i.e., prior to image capture), and which assist in moving the fingers across the sensor in the correct path.

The present invention comprises a self-aligning chip carrier having a recess for receiving and mounting a sweep-type fingerprint sensor with tactile elements formed or mounted on the upper surface of the carrier. The tactile elements may be used to position the finger prior to being read, and to guide the path of the finger as it is swept across the sensor. In one embodiment, the tactile elements comprise two generally parallel ridges formed or positioned adjacent to the sensor to help align the finger and to guide the finger as it is swept across the sensor. In another embodiment, a tactile element comprises a full or partial oval ridge having a major axis which is generally along the path of finger motion. The top of the oval, comprising an arcuate portion of the ridge, is used to position the tip of the finger prior to reading, and the sides of the oval, adjacent to the sensor, assist in guiding the finger as it is swept. The carrier of the present invention may further comprise structure for mounting the carrier on a substrate, such as a printed circuit board. In another aspect, the present invention comprises a method of using a sweep type fingerprint sensor, comprising positioning a finger on the sensor by positioning the tip of the finger in an arcuate tactile element, and swiping the finger across the surface of the sensor.

Accordingly, one object of the present invention is to provide a self-aligning carrier for a sweep-type fingerprint sensor which provides for, improved user reliability during enrollment and authentication of fingerprint images.

Another object of the present invention is to assist users in positioning their fingers prior to using sweep-type fingerprint sensors.

A further object of the present invention is to assist users in guiding their fingers as they are swept across fingerprint sensors.

Yet another object of the present invention is to allow users to accurately position and sweep their fingers when using fingerprint sensors using tactile cues, without the need for visual confirmation.

Additional objects, advantages, aspects and features of the present invention will become apparent from the description of embodiments set forth below.

BRIEF DESCRIPTION OF THE DRAWING

The foregoing aspects and the attendant advantages of the present invention will become more readily appreciated by reference to the following detailed description, when taken in conjunction with the accompanying drawings, wherein.

Reference symbols are used in the Figures to indicate certain components, aspects or features shown therein, with reference symbols common to more than one Figure indicating like components, aspects or features shown therein.

DETAILED DESCRIPTION OF THE INVENTION

To facilitate its description, the invention is described below in terms of specific embodiments and with reference to the Figures.

Figure 7A:
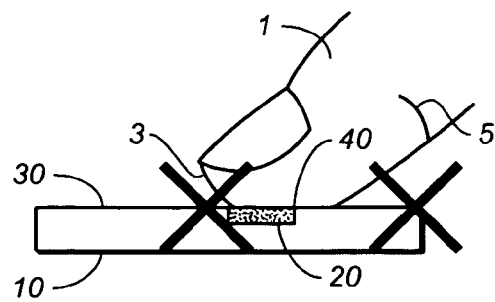
FIGS. 7a–7c depict common user errors associated with sweep-type fingerprint sensors.
Figure 7B:
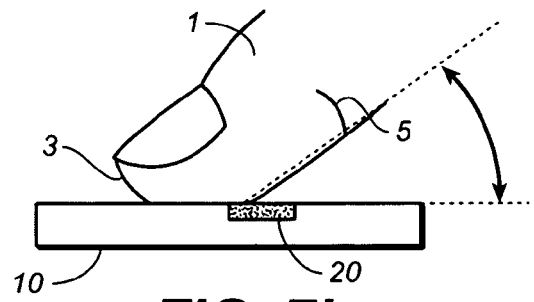
Figure 7C:
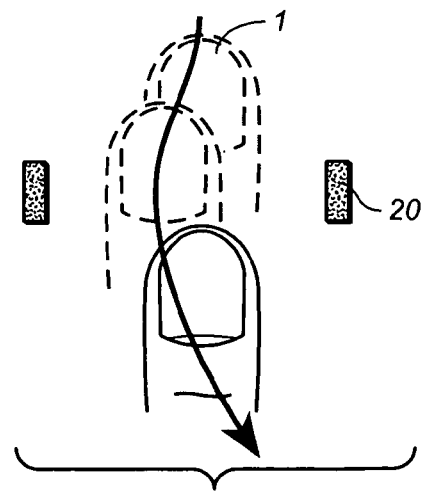

As discussed above, reliable fingerprint identification requires first the enrollment of an accurate fingerprint image which is captured and stored for later comparative purposes and, thereafter, accurate capturing of a user's fingerprint image for purposes of authentication. Both of these processes require the capturing of a high quality image, and consistency in the image capturing process. Turning to FIGS. 7a–7c, common errors in capturing images with a sweep-type sensor are depicted. Each of FIGS. 7a–7c show a finger 1 placed on a fingerprint sensor 20, held by a carrier 10. The upper surface 40 of sensor 20 is shown flush mounted with the upper surface 30 of carrier 10. In order to capture a high quality image, a substantial length of the finger 1, between the finger tip 3 and the first joint 5 should be swept across upper surface 40 of sensor 20 in a consistent manner. Errors are prone to occur when: (1) not enough the finger is swept across sensor, such as when the user starts the sweep by initially placing his or her finger tip 3 on the sensor, as depicted in FIG. 7a; (2) the finger is tilted during the sweep, such that a portion of it does not make good contact with the sensor, as depicted in FIG. 7(b); or (3) the finger does not follow a straight path as it travels across the sensor, as depicted in FIG. 7(c). In order to avoid these errors, it is important for users to be consistent in correctly positioning and sweeping their fingers across the sensor. The present invention is directed to structures and methods to assist user consistency, and thereby enhance reliability of sweep-type fingerprint sensors.

Figure 1A:
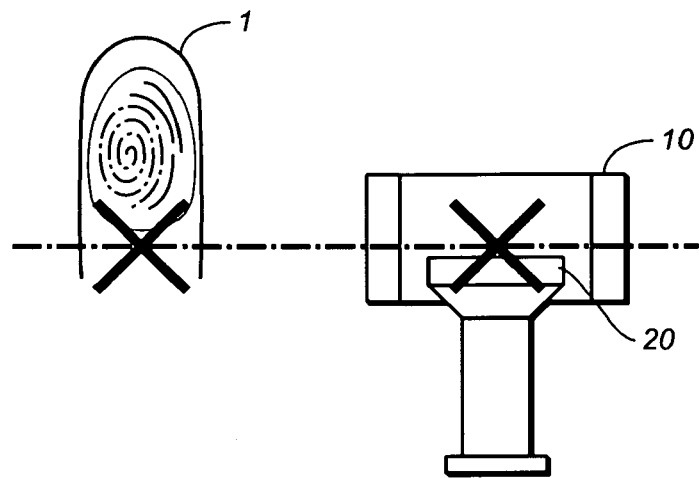
FIGS. 1a–1c are plans views depicting a first embodiment of the carrier of the present invention, showing the positioning and movement of a finger.
Figure 1B:
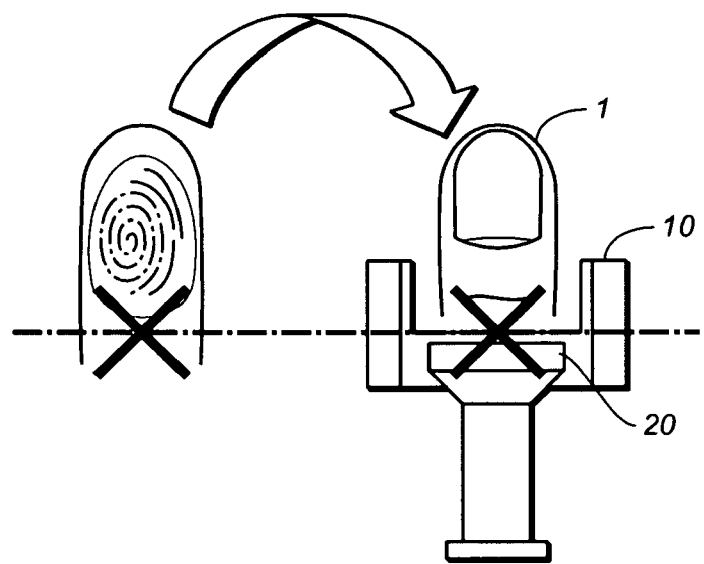
Figure 1C:
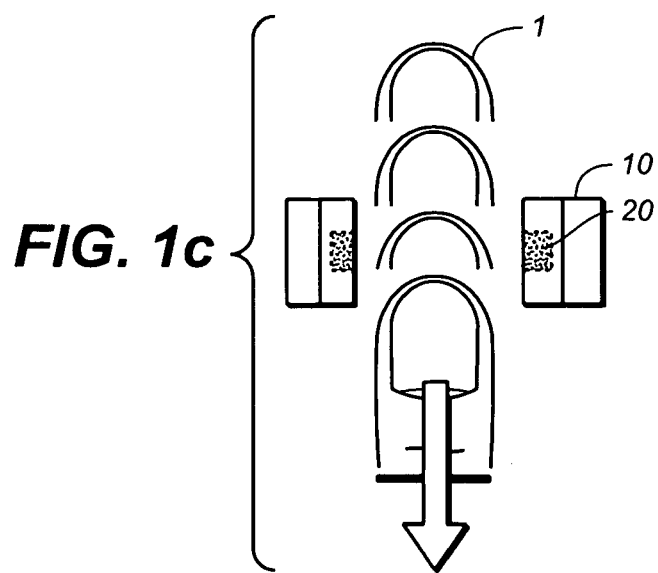
Figure 1D:
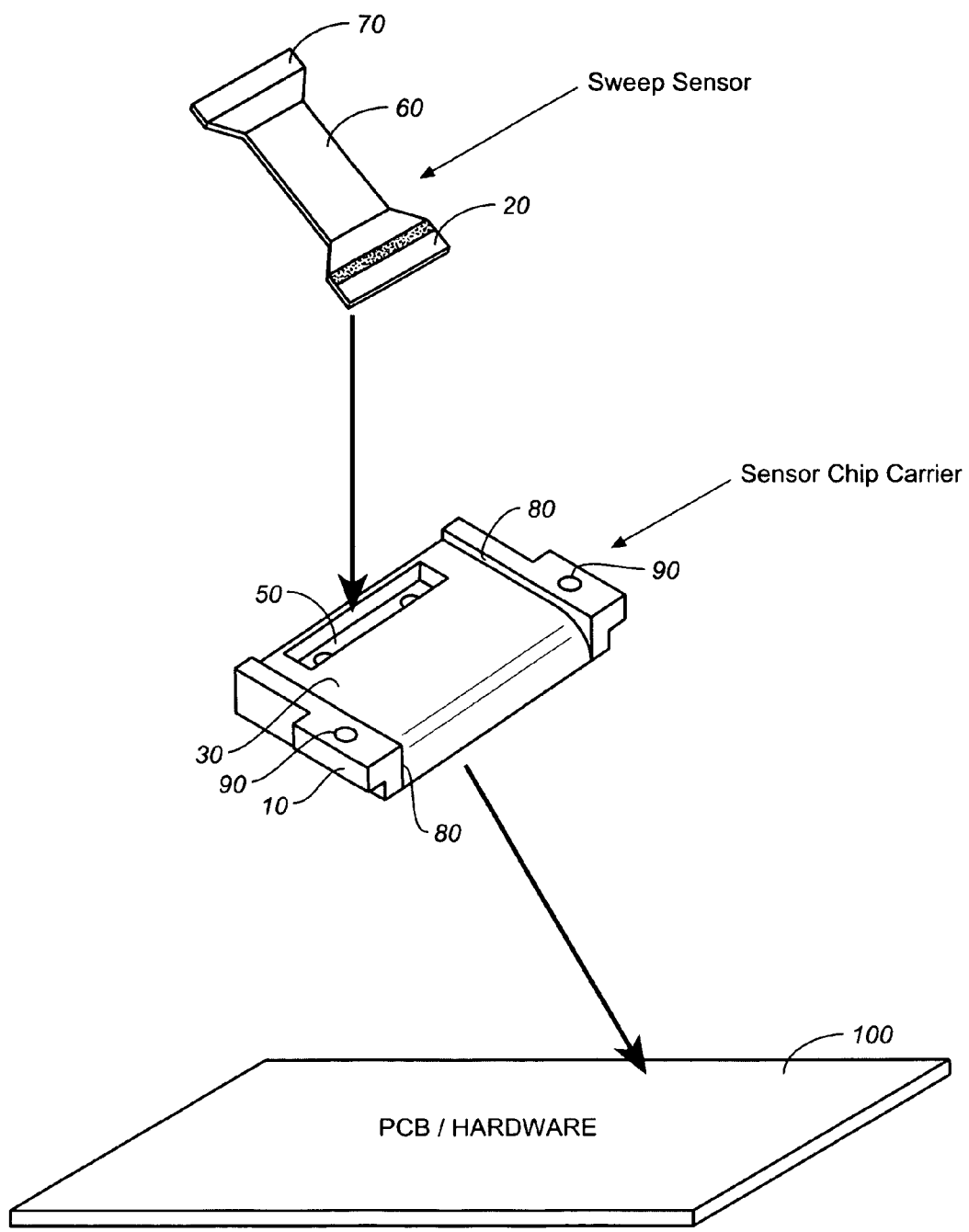
FIG. 1d is an exploded isometric view of an embodiment of the invention.

A first embodiment of the present invention is depicted in FIGS. 1a–1d. FIG. 1d is an exploded isometric view of a carrier 10 having a recess 50 for receiving sensor 20. Sensor 20 is initially mounted on and electrically coupled to a flexible interconnect structure 60 having a plurality of contact pads on the distal end 70 thereof. Carrier 10 further comprises a pair of parallel ridges 80 positioned adjacent to sensor 20, which are also parallel to the intended direction of finger motion as it is swept across the sensor. Note that a characteristic of a sweep sensor is that it has a generally elongate rectangular shape, as depicted in the Figures, and that the finger motion is intended to be parallel to the short sides of the rectangle. Carrier 10 also includes a mounting structure for coupling the carrier to a substrate, such as printed circuit board 100. In the embodiment of FIG. 1d, the mounting structure comprises through holes 90 for screws, rivets or other fasteners. Those skilled in the art will appreciate that other mounting structures, such as integrally formed pins or snaps can also be formed on the carrier to attach it to a substrate. Carrier 10 may be made of any suitable material. The use of machined or molded plastic is presently considered to be preferred because of the ease fabrication and relatively low cost.

Ridges 80 form a visual and tactile guide to the user for correctly positioning and moving his or her finger. As shown in FIGS. 1a–1c, the user initially places the crease in his or her finger, located that the end of the first finger digit, distal from the finger tip, at the edge of the sensor 20 and then moves the finger digit across sensor 20 for image capture. Ridges 80 assist the user in guiding the finger along a consistent path.

Figure 2:
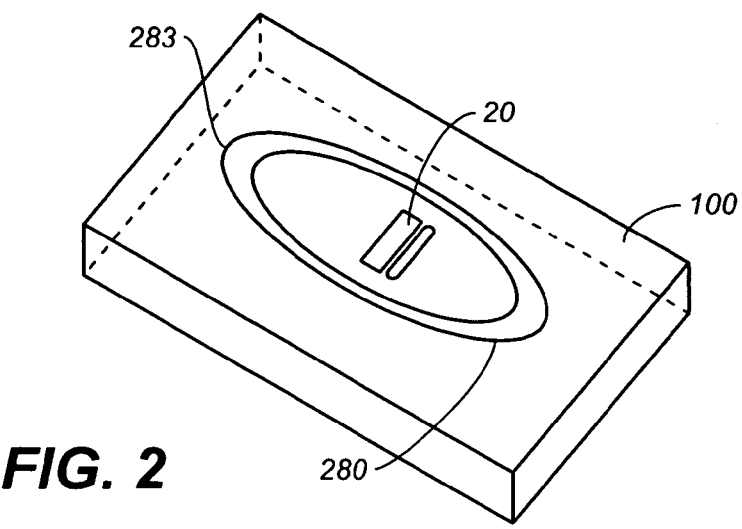
FIG. 2 is an isometric view of another embodiment of the self-aligning carrier of the present invention.
Figure 3:
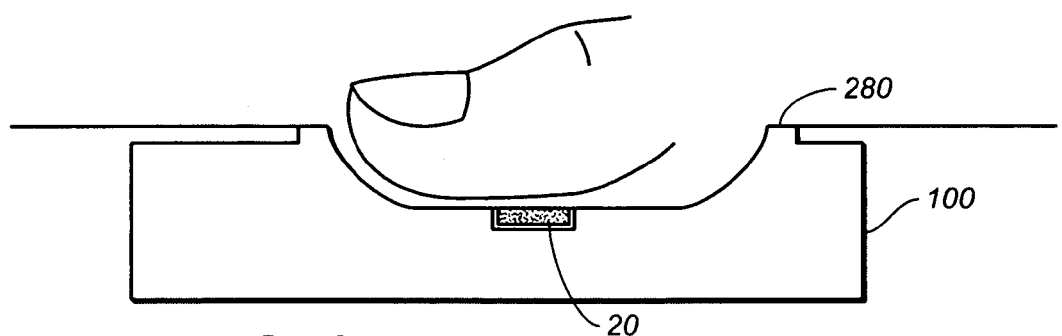
FIG. 3 is a cross-sectional view of the embodiment of FIG. 2.
Figure 4:
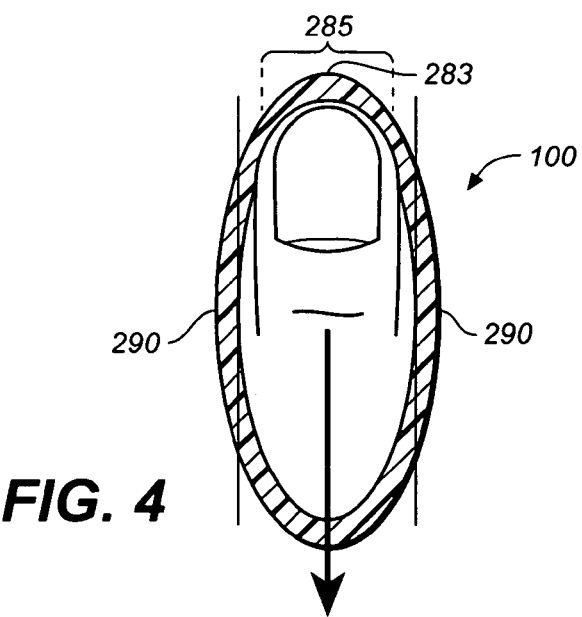
FIG. 4 is a plan view of the embodiment of FIG. 2.

FIGS. 2–4 show a preferred embodiment of the present invention including an additional tactile element to assist the user in accurately and consistently positioning the tip of the finger prior to image capture. The embodiment shown in these Figures comprises a carrier 100 for sensor 20 comprising an oval ridge 280 surrounding sensor 20. Oval ridge 280 is generally positioned with its major axis along the desired path for sweeping the finger being read, and with its minor axis running through the sensor. A finger tip reference point 283 is located at the "top" of oval ridge 280, and is used to position the finger tip. Ridge 280 has an arcuate portion 285 (identified in FIG. 4) which provides tactile assistance to the user in accurately positioning his or her fingertip prior to fingerprint image capture. Preferably arcuate portion 285 has a curvature which approximates the curvature of the fingertip of an average user. However, in order to achieve the benefits of the present invention it is not necessary that the curvature be an exact match and the oval ridge is useful with a wide variety of finger sizes. Likewise, preferably, the distance from fingerprint reference point 283 to the edge of sensor 20 is approximately the average length of an adult finger digit. Again, exact precision is not required. Finally, preferably the minor axis of oval ridge 280 is slightly larger that the width of a large adult finger.

As best shown in the cross-sectional view of FIG. 3, ridge 280 has a curved wall between the top and bottom. The curvature of the ridge wall is preferably approximately equal to the curvature of the average finger tip. This curvature, in combination with the curvature of the ridge in the vicinity of the finger tip reference point, provides the user with the tactile sensation of nesting his or her finger tip in the arcuate portion 285 of the oval ridge structure 280. As also depicted in FIGS. 3 and 4, ridge 280 may be created by forming an oval recess in the upper surface of carrier 100.

Due to the elongate shape of oval ridge 280, the opposing side walls 290 of ridge 280 are substantially parallel to each other in the vicinity immediately adjacent to the sensor 20. Side walls 290 of oval ridge provide the user with tactile references for guiding his or her finger as it is swept across the sensor.

In use, when the user places his or her finger onto the chip carrier, the finger tip will come to rest at reference point 283, guided by the tactile sensations provided by arcuate portion 285, and preferably assisted by the curvature of the ridge wall. This tactile guiding requires no visual confirmation or assistance for proper finger placement. After the finger is correctly located, the image capture can be preformed by sweeping the finger across the sensor 20. In accordance with the present invention, sidewalls 290 of ridge 280 assist the user in accurately and reproducibly sweeping her or his finger across sensor 20. Again, side walls 290 act as a tactile guide, without the necessity of visual observation.

In one method of using the embodiment of FIGS. 2–4 of the present invention, the user keeps the edge of his or her finger in contact with one of side walls 290 during the image capture sweep rather than simply sweeping the finger straight across the sensor. When using the invention in this manner the path followed is not perfectly straight. However, maintaining finger contact with a side wall enables the user to follow substantially the same path with each use of the device, thereby enhancing consistency and, therefore, the reproducibility of results.

While the preferred embodiment depicted in FIGS. 2–4 has ridge which forms a complete oval to provide tactile assistance, it will be appreciated that the present invention does not require the use of a complete oval. Thus, in alternative embodiments, a partial oval, for example a half oval, may be used, or simply isolated portions of an oval. For example, many of the benefits of the present invention can be achieved with a ridge comprising simply arcuate portion 285 and sidewalls 290. As described, these are the key elements which provide tactile assistance to the user in positioning and guiding a finger being read.

Figure 5:
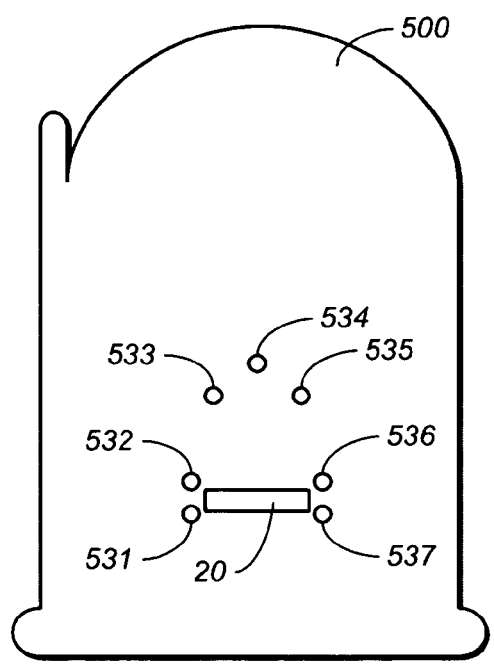
FIG. 5 depicts a cellular telephone comprising yet another embodiment of the present invention.

Turning now to FIG. 5, an alternative embodiment of the present invention is shown in the context of a sweep-type fingerprint sensor 20 mounted on a cellular phone 500. While a cellular phone is shown for exemplary purposes, the actual device employing the fingerprint sensor is not part of the present invention. Positioned in the vicinity of sensor 20 is a plurality of raised hemispheres or "bumps" 531–537 which provide tactile guidance to the user. As depicted, three of the bumps, 533, 534 and 535, form a triangle above sensor 20, with bump 534 at the peak of the triangle, lying substantially on a line normal to the major dimension of the sensor and intersecting the center of the sensor. For purposes of the present invention, bumps 533–535 form an arcuate portion 550, providing tactile members used to position the finger prior to commencement of fingerprint image capture. Likewise, bump pairs 531, 532 and 536, 537, act as tactile members to assist the user in correctly guiding his or her finger across the sensor.

As depicted in FIG. 5, the tactile elements are contained located on the surface of the device which employing the fingerprint sensor. In this configuration, the tactile elements are not located on the carrier itself. Thus, in the embodiment of FIG. 5, the carrier is located within the device, and access to sensor 20 is provided by an aperture in the device wall.

Figure 6:
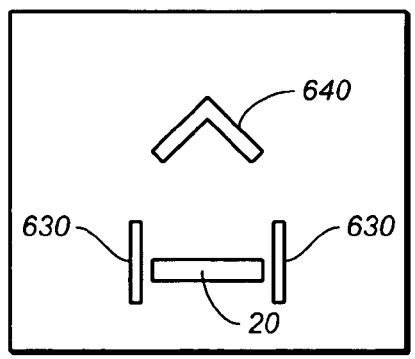
FIG. 6 is a plan view of a carrier comprising yet another embodiment of the present invention.

Yet another embodiment of the present invention is depicted in FIG. 6, showing a sensor carrier 600, having a sensor 20 mounted thereon. Carrier 600 has two raised side wall ridges 630 adjacent to the sides of sensor 20 and a chevron-shaped ridge 640 positioned above the sensor. For purposes of the present invention, chevron-shaped ridge 640 forms an arcuate portion which is used to accurately position the finger to be read, as previously described. Likewise, side walls 630 are used to assist guiding the finger during image capture.

The invention has now been explained with regard to specific embodiments. Variations on these embodiments and other embodiments may be apparent to those of skill in the art. It is therefore intended that the invention not be limited by the discussion of specific embodiments. It is understood that the examples and embodiments described herein are for illustrative purposes only and that various modifications or changes in light thereof will be suggested to persons skilled in the art and are to be included within the spirit and purview of this application and scope of the appended claims

What is claimed is:

1. A self aligning carrier for a sweep-type fingerprint sensor comprising:

a body having an upper surface and comprising a recess in said upper surface for receiving a generally rectangular sweep-type fingerprint sensor having long sides and short sides, at least one tactile element positioned on said upper surface adjacent to each said short side for assisting a user in moving a finger across said sensor in a desired path, and an additional tactile element for assisting the user position said finger at a starting location prior to moving said finger across said sensor.

2. The carrier of claim 1 wherein said tactile elements comprise two elongate ridges raised above the surface of said sensor, said ridges being generally parallel to each other in the area of the sensor.

3. The carrier of claim 1 wherein said additional tactile element comprises a generally arcuate structure for receiving the tip of a finger.

4. The carrier of claim 1 comprising a ridge which is at least partially oval and defining a major axis, said recess being located on said major axis.

5. The carrier of claim 4 wherein said ridge forms a complete oval.

6. The earner of claim 1 further comprising a mounting structure for mounting said carrier on a substrate.

7. A self aligning carrier for a sweep-type fingerprint sensor comprising:

a body having an upper surface and comprising a recess in said upper surface for receiving a generally rectangular sweep-type fingerprint sensor having long sides and short sides, at least one tactile element positioned on said upper surface of said body, for assisting a user in correctly positioning a finger to be sensed at a starting location prior to moving said finger across said sensor, and in correctly moving the finger across the surface of said sensor.

8. The carrier of claim 7 wherein said at least one tactile element comprises an arcuate ridge portion for positioning the tip of a finger.

9. The carrier of claim 8 wherein said tactile element comprises an oval ridge.

10. A structure for positioning a finger on a sweep-type fingerprint sensor having an axis defining the direction of finger movement across the sensor, comprising:

an arcuate tactile member comprising one or more tactile elements positioned on the axis of the rectangular sweep-type fingerprint sensor, and at least one tactile member adjacent to each side of the fingerprint sensor and an additional tactile element for assisting a user position a finger at a starting location prior to moving said finger across said sensor.

11. The structure of claim 10 wherein said arcuate tactile member comprises a plurality of bumps.

12. The structure of claim 10 wherein said arcuate tactile member comprises a continuous ridge.

13. The structure of claim 12 wherein said ridge is a portion of an oval.

14. The structure of claim 12 wherein said ridge has a curved sidewall.

15. The structure of claim 12 wherein said ridge is chevron-shaped.

16. A method of sensing a fingerprint using a rectangular sweep-type fingerprint sensor, comprising:
- positioning the tip of a finger at a starting location using a first tactile element comprising an arcuate ridge located adjacent to a rectangular sweep-type fingerprint sensor, and
- moving the finger across the sensor in a desired path using a second tactile element comprising at least one elongate ridge raised above a surface of the sensor.

17. A self aligning carrier for a sweep-type fingerprint sensor comprising:
- a body having an upper surface and comprising a recess in said upper surface for receiving a generally rectangular sweep-type fingerprint sensor having long sides and short sides,
- at least one tactile element comprising an arcuate ridge portion for positioning the tip of a finger positioned on said upper surface of said body, for assisting a user in correctly positioning a finger to be sensed and in correctly moving the finger across the surface of said sensor.

18. A self aligning carrier for a sweep-type fingerprint sensor comprising:
- a body having an upper surface and comprising a recess in said upper surface for receiving a generally rectangular sweep-type fingerprint sensor having long sides and short sides,
- at least one tactile element positioned on said upper surface of said body, for assisting a user in correctly positioning a finger to be sensed and in correctly moving the finger across the surface of said sensor,
- wherein said tactile element comprises at least a portion of an oval ridge.

19. A self-aligning carrier for a sweep-type fingerprint sensor comprising:
- a body having an upper surface and comprising a recess in said upper surface for receiving a generally rectangular sweep-type fingerprint sensor having long sides and short sides,
- a least one tactile element positioned on said upper surface adjacent to each said short side for assisting a user is moving a finger across said sensor in a desired path, wherein said tactile element comprises a chevron-shaped ridge.

* * * * *